(12) United States Patent
Yeh

(10) Patent No.: US 6,530,119 B2
(45) Date of Patent: Mar. 11, 2003

(54) CASTER STRUCTURE

(76) Inventor: Tsung Han Yeh, P.O. Box 2103, Taichung (TW)

(*) Notice: Subject to any disclaimer, the term of this patent is extended or adjusted under 35 U.S.C. 154(b) by 0 days.

(21) Appl. No.: 09/891,450

(22) Filed: Jun. 27, 2001

(65) Prior Publication Data

US 2002/0004968 A1 Jan. 17, 2002

(30) Foreign Application Priority Data

Jul. 14, 2000 (TW) .................................... 89212159 U

(51) Int. Cl.⁷ ............................................... B60B 33/00
(52) U.S. Cl. .................... 16/21; 16/26; 16/37; 16/35 D; 16/35 R
(58) Field of Search ............................... 16/21, 20, 24, 16/25, 26, 37, 38, 35 D, 35 R

(56) References Cited

U.S. PATENT DOCUMENTS

| | | | | |
|---|---|---|---|---|
| 1,203,879 A | * | 11/1916 | Janzen | 16/21 |
| 1,233,093 A | * | 7/1917 | Malloy | 16/20 |
| 1,344,864 A | * | 6/1920 | Chesnutt | 16/21 |
| 1,576,923 A | * | 3/1926 | Malloy | 16/20 |
| 1,868,552 A | * | 7/1932 | Walter | 16/21 |
| 2,990,191 A | * | 6/1961 | Black | 16/21 |
| 3,127,633 A | * | 4/1964 | Schutz, Jr. | 16/21 |
| 4,219,903 A | * | 9/1980 | Black | 16/21 |
| 4,707,880 A | * | 11/1987 | Doyle et al. | 16/21 |
| 4,777,697 A | * | 10/1988 | Berndt | 16/21 |
| 4,835,815 A | * | 6/1989 | Mellwig et al. | 16/35 R |
| 5,199,131 A | * | 4/1993 | Harris | 16/18 R |

FOREIGN PATENT DOCUMENTS

| | | | |
|---|---|---|---|
| DE | 3246355 | * | 6/1984 |
| DE | 3229938 | * | 3/1985 |
| DE | 4221541 | * | 1/1993 |
| JP | 55-140602 | * | 4/1980 |
| JP | 3-200401 | * | 2/1991 |

* cited by examiner

Primary Examiner—Thomas B. Will
Assistant Examiner—Thomas A. Beach

(57) ABSTRACT

A caster structure including a seat body, a linking member, a caster seat and a lower bearing cover. The linking member is integrally formed with an upper bearing cover. The seat body is formed with a differential fixing hole and the top of the linking member is formed with a fixing section. The shape of the cross-section of the fixing section is an internal tangential circle of the differential fixing hole. When the fixing section is passed through the fixing hole and compressed and fixedly riveted, the fixing section will form a differential section complementary to the fixing hole. Accordingly, the linking member is firmly connected with the seat body without rotation.

2 Claims, 4 Drawing Sheets

CASTER STRUCTURE

BACKGROUND OF THE INVENTION

The present invention is related to an improved caster structure having better connection strength for more stably support an appliance, whereby the appliance can be more freely moved and rotated.

FIG. 6 shows a conventional caster having a seat body 81 mounted under the bottom of an appliance. The seat body 81 has a fixing hole 811 for a fixing section 821 of a thread rod 82 to pass therethrough and be riveted and fixed. An upper bearing cover 83, a caster seat 84 and a lower bearing cover 85 are fitted on the bottom end of the thread rod 82. Multiple beads 86 are disposed between the upper bearing cover 83, caster seat 84 and lower bearing cover 85 to form a thrust bearing. A nut 87 is screwed on the rear end of the thread rod 82 to fix the same. A wheel 841 is rotatably connected with the caster seat 84.

Referring to FIG. 7, when moving the appliance, the total weight of the appliance is loaded onto the caster 841. Accordingly, the thread rod 82, caster seat 84 and the upper and lower bearing covers 83, 85 all suffer considerably great stress in different directions. After a period of use, the thread rod 82 is simply riveted with the seat body 81 and is not restricted from rotation. Therefore, when suffering the force, the fixing section 821 of the thread rod 82 will rotate and swing within the fixing hole 811 of the seat body 81 to enlarge the fixing hole 811. Also, the rivet section of the fixing section 821 will be worn out and deformed. As a result, the thread rod 82 will swing to affect the stability of the appliance and the caster no more simply suffers axial force from the appliance. Accordingly, the caster seat 84 will be seriously tilted and when pushing the appliance, a corner of the appliance may suddenly lose the support to lead to unbalance of the appliance. Under such circumstance, the appliance may fall down and cause danger. Furthermore, moving the appliance, the upper bearing cover 83 will suffer force in different directions to gradually enlarge the hole 831 in which the thread rod 82 is fitted. Also, the upper bearing cover 83 will bend, deform and loosen. Accordingly, the gap between the circumference 832 of the upper bearing cover 83 and the caster seat 84 will be enlarged and the bead 86 may drop out and lose the effect of the thrust bearing. As a result, it will be hard to rotate and change the direction of the caster seat 84.

SUMMARY OF THE INVENTION

It is therefore a primary object of the present invention to provide an improved caster structure in which the seat body is formed with a differential fixing hole and the top of the linking member is formed with a fixing section. The shape of the cross-section of the fixing section is an internal tangential circle of the differential fixing hole. When the fixing section is passed through the fixing hole and compressed and fixedly riveted, the fixing section will form a differential section complementary to the fixing hole. Accordingly, the linking member is firmly connected with the seat body without rotation. Therefore, the linking member and the seat body are prevented from being worn out and deformed and the problem caused by tilting of the linking member can be avoided and the appliance can be stably moved.

It is a further object of the present invention to provide the above caster structure in which the upper bearing cover is integrally formed with the linking member so that the upper bearing cover is not subject to wearing and deformation. The bearing section of the caster seat is formed with an annular rib corresponding to the outer circumference of the upper bearing cover for stopping the beads from dropping out. Therefore, the thrust bearing effect can be kept and the caster seat can be freely moved to change the direction of the wheel.

The present invention can be best understood through the following description and accompanying drawings wherein:

DETAILED DESCRIPTION OF THE PREFERRED EMBODIMENT

Figure 1:
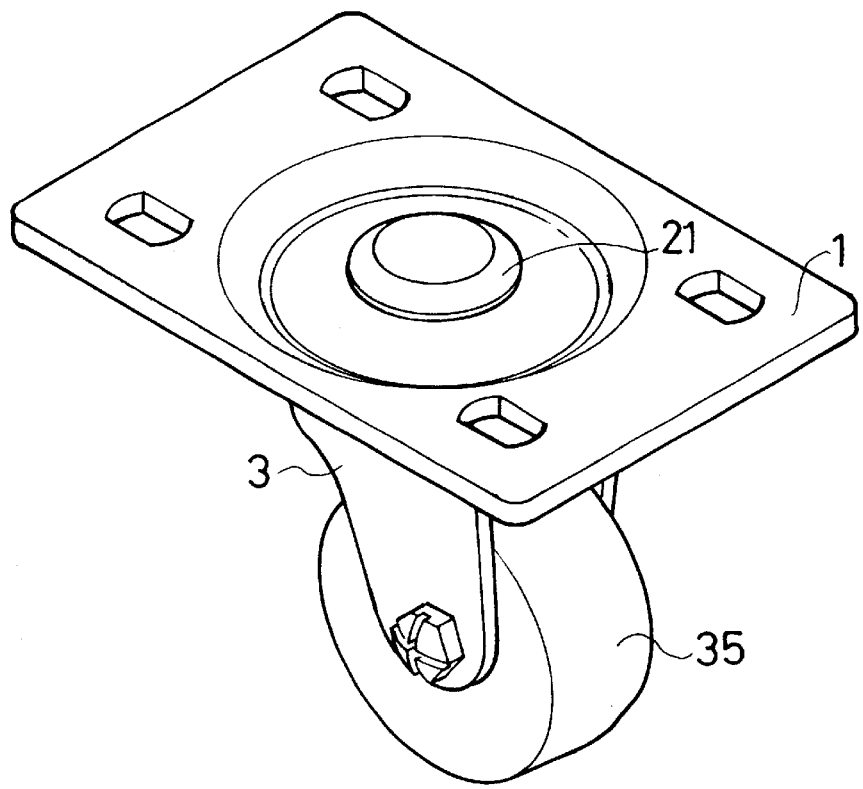
FIG. 1 is a perspective assembled view of the present invention.
Figure 2:
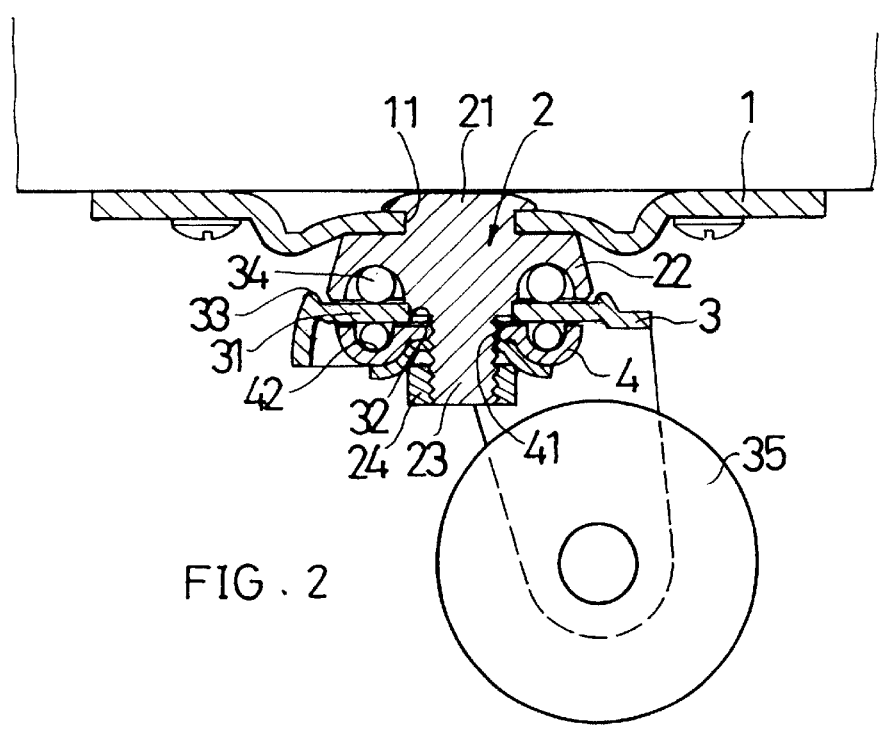
FIG. 2 is a sectional assembled view of the present invention.
Figure 4A:
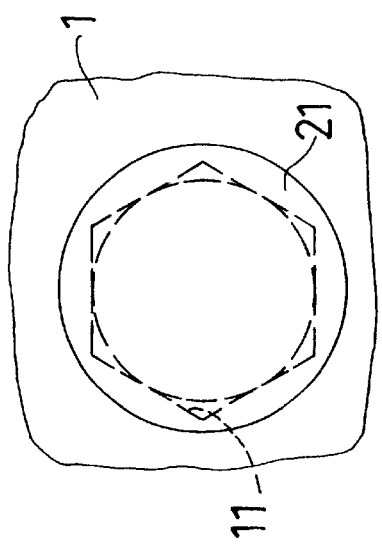
FIG. 4A is a top view showing that the fixing section of the linking member fitted in the fixing hole of the seat body is deformed and riveted.
Figure 4B:
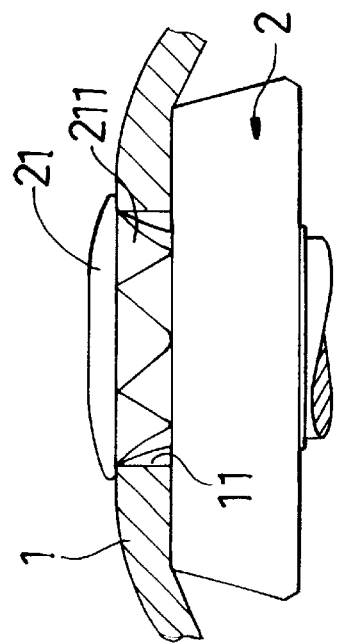
FIG. 4B is a partially sectional showing that the fixing section of the linking member fitted in the fixing hole of the seat body is deformed and riveted.
Figure 3A:
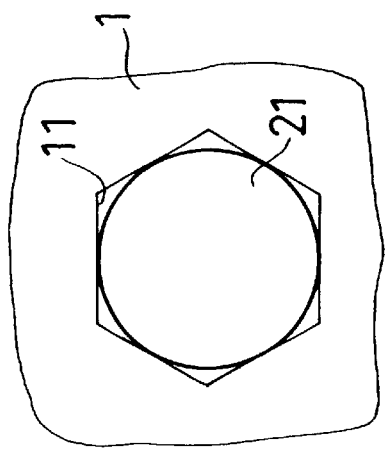
FIG. 3A is a top view showing that the fixing section of the linking member is fitted in the fixing hole of the seat body of the present invention.
Figure 3B:
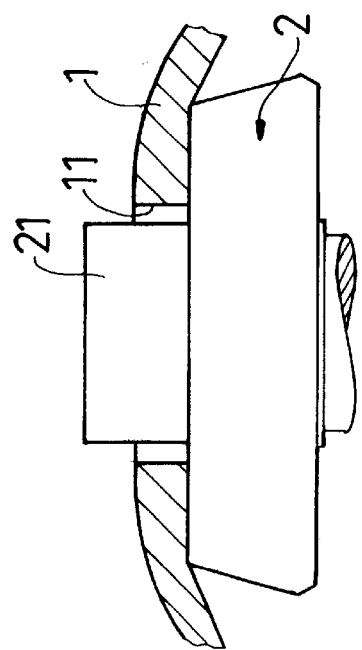
FIG. 3B is a partially sectional view showing that the fixing section of the linking member is fitted in the fixing hole of the seat body of the present invention.
Figure 5:
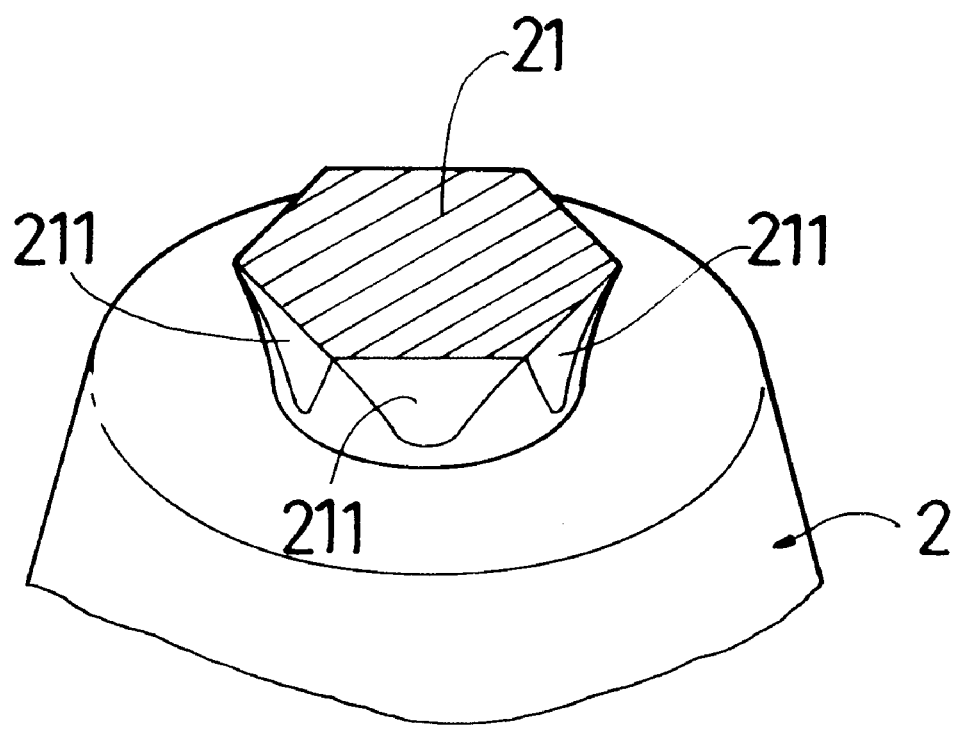
FIG. 5 is a perspective view showing that the fixing section of the linking member of the present invention is compressed and deformed.
Figure 6:
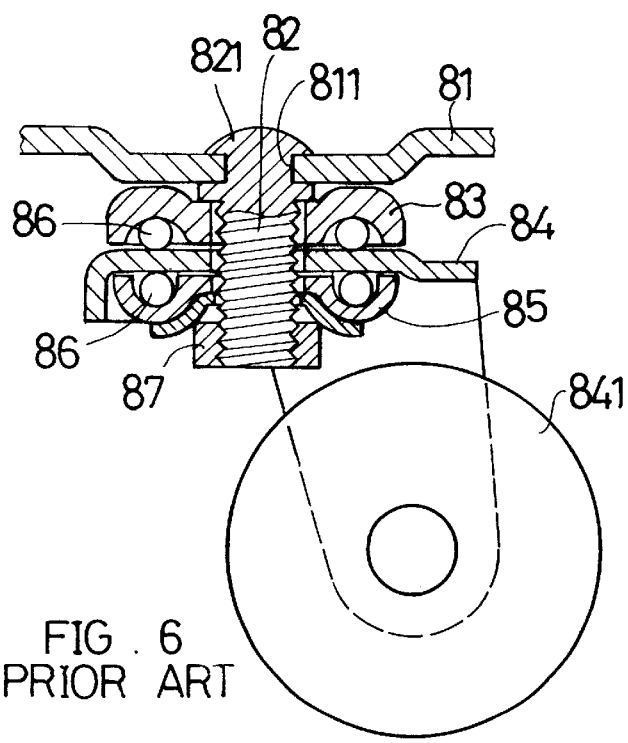
FIG. 6 is a sectional assembled view of a conventional caster structure.
Figure 7:
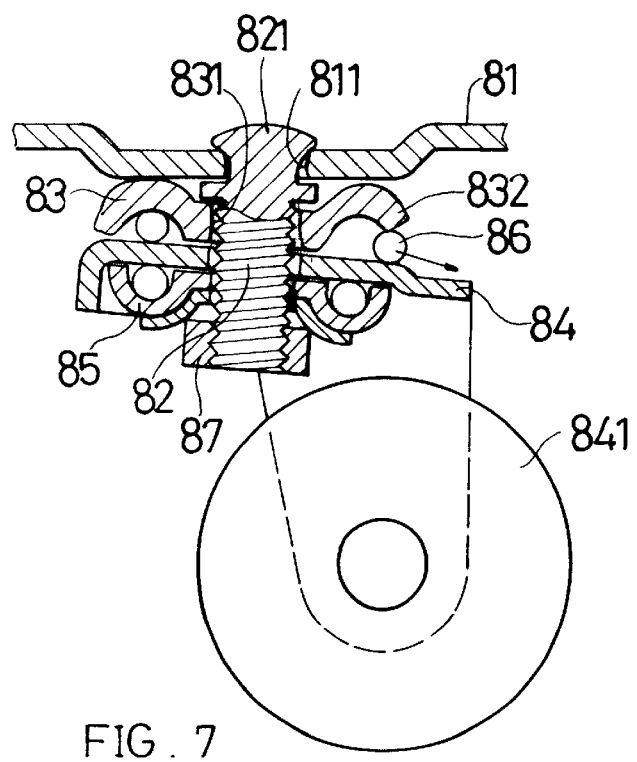
FIG. 7 is a sectional view according to FIG. 6, showing that the conventional caster suffers a force and deforms.

Please refer to FIGS. 1 to 5. The caster structure of the present invention includes a seat body 1, a linking member 2, a caster seat 3 and a lower bearing cover 4. The seat body 1 is mounted under the bottom of an appliance. The seat body 1 is formed with a differential fixing hole 11. The linking member 2 connects the seat body 1 with the caster seat 3. In this embodiment, the linking member 2 is a thread rod. The top of the linking member 2 is formed with a fixing section 21. The shape of the cross-section of the fixing section 21 is an internal tangential circle of the differential fixing hole 11 as shown in FIGS. 3A and 3B. When the fixing section 21 is passed through the fixing hole 11 and compressed and fixedly riveted, the fixing section 21 will form a differential section 211 complementary to the fixing hole 11 as shown in FIGS. 4A, 4B and 5. The linking member 2 is integrally formed with an upper bearing cover 22. The bottom section of the linking member 2 is formed with a thread section 23 on which a nut 24 is screwed to fasten the upper and lower bearing covers 22, 4 and the caster seat 3 to hold the beads in place.

The caster seat 3 has a bearing section 31 formed with a central hole 32 in which the linking member 2 is fitted. The bearing section 31 is formed with an annular rib 33 corresponding to the outer circumference of the upper bearing cover 22. The caster seat 3 is disposed under the upper bearing cover 22. Multiple beads 34 are disposed between the upper bearing cover 22 and the bearing section 31. A wheel 35 is rotatably disposed under the caster seat 3.

The lower bearing cover 4 is formed with a hole 41 for fitting on the linking member 2. The lower bearing cover 4 is disposed under the caster seat 3. The top face of the lower bearing cover 4 is formed with an annular groove 42 in which multiple beads 43 are disposed between the lower bearing cover 4 and the caster seat 3.

When the fixing section 21 of the linking member 2 is compressed and riveted with the seat body 1, the fixing section 21 is deformed to form a differential section 211 complementary to the fixing hole 11 of the seat body 1 as shown in FIG. 5. Accordingly, the linking member 2 is firmly connected with the seat body 1 and the differential section 211 of the linking member 2 and the fixing hole 11 of the seat body 1 restrict each other so as to prevent the linking member 2 from rotating. Therefore, the linking member 2 and the seat body 1 are prevented from being worn out and deformed and the problem caused by tilting of the linking member 2 can be avoided. The linking member 2 keeps suffering an axial force so that the appliance can be stably moved.

Moreover, the upper bearing cover 22 is integrally formed with the linking member 2 so that the upper bearing cover 22 is not subject to wearing and deformation. The bearing section 31 of the caster seat 3 is formed with an annular rib 33 corresponding to the outer circumference of the upper bearing cover 22 so that even if the upper bearing cover 22 is deformed, the annular rib 33 can still stop the beads 34 from dropping out. Therefore, the thrust bearing effect can be kept and the caster seat 3 can be freely moved to change the direction of the wheel 35.

The above embodiment is only used to illustrate the present invention, not intended to limit the scope thereof. Many modifications of the above embodiment can be made without departing from the spirit of the present invention.

What is claimed is:

1. A caster structure comprising a seat body, a linking member, a caster seat and a lower bearing cover, the seat body, being mounted under a bottom of an appliance, the linking member connecting the seat body with the caster seat, the linking member having an upper bearing cover that is integrally formed with the linking member and has an annular groove defined in a top face of the upper bearing cover, the caster seat having a bearing section formed with a central hole in which the linking member is fitted, the caster seat being disposed under the upper bearing cover, multiple beads being disposed between the upper bearing cover and the bearing section, a wheel being rotatably disposed under the caster seat, the lower bearing caver being formed with a hole in which the linking member is fitted, the lower bearing cover being disposed under the caster seat, a top face of the lower bearing cover being formed with an annular groove in which multiple beads are disposed between the lower bearing cover and the caster seat, the linking member having a bottom section formed with a thread section on which a nut is screwed to fasten the upper and lower bearing and the caster seat to hold the beads in place, the caster structure being characterized in that the seat body is formed with a differential fixing hole and the top of the linking member is formed with a fixing section, the shape of the cross-section of the fixing section being an internal tangential circle of the differential fixing hole, whereby when the fixing section is passed through the fixing hole and compressed and fixedly riveted, the fixing section will form a differential section complementary to the fixing hole.

2. The caster structure as claimed in claim 1, wherein the bearing section of the caster seat is formed with an annular rib corresponding to outer circumference of the upper bearing cover.

* * * * *